(12) United States Patent
Lilly et al.

(10) Patent No.: US 6,310,129 B1
(45) Date of Patent: Oct. 30, 2001

(54) PROCESSING AND USE OF CARBIDE LIME

(75) Inventors: Martin J. Lilly, Toronto; Mark D. Meade, Oro Station; Jacques Mortimer, Markham, all of (CA)

(73) Assignee: RebaseProducts Inc., Ontario (CA)

( * ) Notice: Subject to any disclaimer, the term of this patent is extended or adjusted under 35 U.S.C. 154(b) by 0 days.

(21) Appl. No.: 09/509,733

(22) PCT Filed: Oct. 2, 1998

(86) PCT No.: PCT/CA98/00934

§ 371 Date: May 25, 2000

§ 102(e) Date: May 25, 2000

(87) PCT Pub. No.: WO99/18151

PCT Pub. Date: Apr. 15, 1999

(30) Foreign Application Priority Data

Oct. 2, 1997 (CA) .................................................. 2213086

(51) Int. Cl.$^7$ ................ C08K 3/14; C08K 3/20; C01B 31/30
(52) U.S. Cl. ............ 524/424; 524/400; 423/439; 423/441
(58) Field of Search .................. 524/404, 424, 524/548, 582, 585, 560, 563, 605; 423/439, 441, 442, 432, 640

(56) References Cited

U.S. PATENT DOCUMENTS

| | | | |
|---|---|---|---|
| 4,147,755 | * 4/1979 | Gogineni et al. ................ | 423/242 |
| 4,243,579 | * 1/1981 | Keogh ............................. | 524/423 |
| 4,451,268 | * 5/1984 | Lerch .............................. | 48/3 A |
| 4,480,065 | * 10/1984 | Kawai et al. ................... | 524/418 |
| 4,764,544 | * 8/1988 | Carey et al. .................... | 523/205 |
| 4,847,317 | 7/1989 | Dokurno et al. . | |
| 5,206,284 | * 4/1993 | Fukui et al. .................... | 524/504 |
| 5,648,413 | * 7/1997 | Sato et al. ...................... | 252/400.3 |
| 5,705,141 | * 1/1998 | Dumont et al. ................. | 423/640 |
| 5,783,714 | * 7/1998 | McKenna et al. .............. | 554/156 |
| 5,997,833 | * 12/1999 | Bunger et al. .................. | 423/309 |

FOREIGN PATENT DOCUMENTS

| | | |
|---|---|---|
| 214011 | 6/1984 | (CZ) . |
| 63027 | 9/1967 | (DE) . |
| 157110 | 1/1983 | (IN) . |
| 57177038 | * 10/1982 | (JP) . |
| 07330998 | * 12/1995 | (JP) . |
| 9411455 | 11/1993 | (WO) . |
| WO 97/14650 | * 4/1997 | (WO) . |

OTHER PUBLICATIONS

Lewis, Sr. Richard J.; Hawley's Condensed Chemical Dictionary 12th Ed., Van Nostrand Reinhold Co., New York (p. 204), 1993.*

R.J. Ashley and R. N. Rothon, Plastics, rubber and Composites Processing and Applications Use of Inorganic Fillers To Reduce the Flammability of Polymers. vol. 15 (1991) pp. 19–21.

Krysztafkiewicz, Powder Technology Use of Highly Dispersed, Precipitated Carbonate–Silicate Posders As Fillers For Elastomers vol. 63, (1990) pp. 1–11.

V. A. Ushkov, et al. Plasticheskie Massy Flammability Of Highly–Filled Materials Based on Epoxy Oligomers, (1989) No. 1. pp. 83–84.

* cited by examiner

Primary Examiner—Vasu Jagannathan
Assistant Examiner—Callie E. Shosho
(74) Attorney, Agent, or Firm—Huntley & Associates

(57) ABSTRACT

A composition of thermoplastic polymer and powdered dried carbide lime. The composition may also be a composition comprising (a) 5–60 parts by weight of powdered dried carbide lime; (b) 20–95 parts by weight of at least one thermoplastic material selected from the group consisting of thermoplastic polymer, thermoplastic elastomer, and thermoplastic rubber; and (c) 0–60 parts by weight of at least one additive selected from lubricants; stabiliser; antioxidants; plasticisers; pigments and dyes; anti-blocking, anti-static, blowing and release agents; flame-retardants; impact modifiers; coupling and wetting agents; other processing aids and fibrous reinforcing agents. Processes for preparing the powdered dried carbide lime for use as fillers in plastics are also disclosed.

17 Claims, No Drawings

PROCESSING AND USE OF CARBIDE LIME

The present invention relates to the processing and use of a waste by-product of the acetylene industry known as "carbide lime", especially as a filler and extender in thermoplastic compositions, and to the preparation of carbide lime for such use.

"Carbide lime" is the waste by-product generated in the commercial production of acetylene gas by reacting calcium carbide with water. On a dry weight basis, it is primarily comprised of calcium hydroxide (typically 75 to 87%), with varying amounts of calcium carbonate (1 to 15%, depending on exposure to air), and 5 to 10% of silicaceous, carbonaceous and inorganic impurities derived from the calcined limestone and coke used to manufacture the calcium carbide.

In many countries, a "wet" carbide process is used, wherein more than double the stochiometric amount of water is used to ensure that there is no residual unreacted calcium carbide. This maximises acetylene production and eliminates the risk of explosion from residual acetylene retained in the carbide lime waste material. As a consequence, the carbide lime waste is obtained from the settling ('decant') tanks of the "wet" acetylene process as a thixotropic slurry with about 55 to 65% moisture content, and is commonly pumped to outdoor lagoons or pits for storage and dewatering. In other countries, especially in Eastern Europe, a "dry" process is employed, using less water and with vacuum extraction of remaining acetylene gas, resulting in a drier carbide lime with only about 8–10% moisture. Large quantities of both carbide lime by-products are produced each year.

With very few commercial uses of carbide lime and the unwillingness of producers to pay the treatment and disposal costs for neutralising its high pH to make it suitable for landfilling, millions of tons of carbide lime have accumulated as a waste material in lagoons, pits and heaps around the world, and the quantity is increasing annually.

It has been estimated that carbide lime is the third largest tonnage of waste material in the world, after the slag from iron and steel production and coal slag from power stations. Known commercial uses, which collectively account for a very small proportion of the carbide lime produced each year are limited to, for instance, application as a neutralising agent in scrubbing waste acid flue gases, as a constituent of various mortars and cements, use of dried carbide lime admixed with crushed stone in an asphalt binder to produce building blocks and paving material, and the manufacture of low-grade agricultural calcium fertilisers. Methods of drying carbide lime sludge by admixing and chemical reaction with quicklime or calcium carbide to keep the carbonation levels below governmental standards as slaked lime for use in mortars/cements are disclosed by Fedorik et al in Czech patent 214011, issued Jun. 1, 1984. A process for chemical conversion to purified precipitated calcium carbonate powder has also been proposed.

A benefit of the present invention is the ability to use this waste by-product substantially without chemical modification.

The use of fillers in polymer compositions is known, and fillers may impart improved physical properties, such as stiffness, to the final article compared to the unfilled resin. These are often referred to as "reinforcing fillers".

Alternatively, fillers which are substantially lower in unit volume cost than polymer resins may be added to the polymers to displace resin volume and reduce overall composition raw material costs, frequently with reduced, but adequate, physical properties in the final product. Such fillers are sometimes known as "extenders". Frequently fillers perform both functions. Yet other fillers may impart specific properties to the filled compound, e.g. fire retardency, opacity, color etc. either used alone, or more commonly admixed with the more general reinforcing fillers and extenders.

The most commonly used fillers are powdered inorganic materials, although organics such as wood flour are used for special applications, as are glass and other chopped fibers, glass microspheres etc. The inorganic fillers are frequently of mineral origin, purified, ground and dried. The most commercially significant are limestones ( calcium carbonates), talcs, clays or other naturally occurring minerals such as gypsum, barytes, feldspar and various silicates. Due to practical limitations on size reduction equipment, the ground mineral fillers are typically restricted to a minimum average particle of about 2–5 micron ESD (equivalent spherical diameter). For sub-micron particle sizes, fillers may need to be chemically synthesized, where they are referred to as 'precipitated' grades. These precipitated grades are much more costly than ground mineral grades due to the extra costs of synthesis, filtration and drying.

Insoluble metallic hydroxides, notably aluminum (frequently called alumina tri-hydrate) and magnesium, are well-known resin additives. However, their thermochemical performance and that of zinc hydroxide are more akin to hydrated oxides, since they decompose and lose their water of hydration on heating to relatively low temperatures, from 108 through 210° C. As a result, they are generally only used as fire-retardent additives in resin compounds. They are unusable in polymers processed at higher temperatures, e.g. nylon, due to thermal decomposition and consequent porosity of the products obtained.

Commercial synthetic calcium hydroxide has also been investigated as a potential fire retardent additive in thermoplastic resin/polymer systems by Ashley and Rothon, Plastics, Rubber and Composites Processing and Applications 15 (1991) 19–21. However, the proposed use was rejected when it was discovered that, contrary to published data, on heating in the presence of air, calcium hydroxide does not quickly decompose endothermically to its oxide, giving off water of about 580° C., but instead reacts directly, more slowly and exothermically with carbon dioxide of the air to yield calcium carbonate at a lower temperature. WO 98/31542 of Frijs et al proposes use of the gas absorptive properties of calcium hydroxide with respect to carbon dioxide in the film/foil packaging of carbon dioxide-sensitive foodstuffs. This application discloses a laminate having an intermediate layer of calcium hydroxide and/or calcium oxide as gas absorbents, in low density polyethylene (LDPE) film, protected from contact with foodstuffs by a gas-porous layer of plastic film.

In various thermosetting resin systems, the use of commercial synthetic calcium hydroxide is disclosed as a minor additive.

Japanese Patent 8291253, issued to Toray Industries describes blends of polyphenylene sulphide (100 parts), olefin polymers containing halogen, carbonyl and/or cyano groups (2–300 parts), calcium hydroxide (30–250 parts) and fillers (0–350 parts) have improved tracking resistance for electrical and optical intsruments.

In U.S. Pat. No. 4,847,317, issued Jul. 11, 1989, Dokumo et al disclose filled carboxylic acid/anhydride—grafted polyolefin blended compositions, where the grafted reactive resin groups, preferably maleic anhydride, are reacted with specified metallic hydroxide fillers, including calcium hydroxide.

It has now been found that carbide lime may be used as, for instance, a general purpose or reinforcing filler and extender in a wide variety of thermoplastic materials, especially in thermoplastic materials that are non-reactive with carbide lime.

Accordingly, an aspect of the present invention provides a composition of thermoplastic polymer and powdered dried carbide lime, especially 5–60% by weight of carbide lime.

In embodiments of the composition of the present invention, the composition comprises 5–60 parts by weight of carbide lime, 20–95 parts by weight of thermoplastic polymer and 0–60 parts by weight of at least one additive selected from lubricants, stabilizers, antioxidants, plasticisers, pigments and dyes; anti-blocking, anti-static, blowing and release agents; flame-retardants; impact modifiers; coupling and wetting agents; processing aids and fibrous reinforcing agents.

Another aspect of the present invention provides a composition comprising a blend of:
(a) 5–60 parts by weight of powdered dried carbide lime;
(b) 20–95 parts by weight of at least one thermoplastic material selected from the group consisting of thermoplastic polymer, thermoplastic elastomer and thermoplastic rubber; and
(c) 0–60 parts by weight of at least one additive selected from lubricants; stabilisers; antioxidants; plasticisers; pigments and dyes; anti-blocking, anti-static, blowing and release agents; flame-retardants; impact modifiers; coupling and wetting agents; other processing aids and fibrous reinforcing agents.

In embodiments, the carbide lime is inert with respect to the thermoplastic material, or interacts with the thermoplastic material.

Additional aspects of the present invention provides use of carbide lime as a filler in a thermoplastic polymer, use of carbide lime as a filler in a thermoplastic elastomer and use of carbide lime as a filler in a thermoplastic rubber.

In embodiments of the present invention, the thermoplastic material is selected from at least one of polyolefins, polyvinyl chloride, polyvinylidene chloride, copolymers of vinyl chloride or vinylidene chloride with vinyl esters, chlorinated polyvinyl chloride, polyamides, polyacetals, polycarbonates, polyacrylates, thermoplastic polyesters, polystyrene, polybutadiene, polybutylene, copolymers of butylene or butadiene with acrylonitrile, polyester and polyether urethanes, polyetherester elastomers, ethylene/propylene elastomers, and ethylene/propylene/diene elastomers.

Another aspect of the present invention provides a process for the manufacture of a carbide lime filled thermoplastic composition, comprising:
(i) feeding to apparatus for the processing of thermoplastic materials, an admixture of:
(a) 5–60 parts by weight of dried powdered carbide lime;
(b) 20–95 parts by weight of at least one thermoplastic material selected from the group consisting of thermoplastic polymer, thermoplastic elastomer and thermoplastic rubber; and
(c) 0–60 parts by weight of at least one additive selected from lubricants; stabilisers; antioxidants; plasticisers; pigments and dyes; anti-blocking, anti-static, blowing and release agents; flame-retardants; impact modifiers; coupling and wetting agents; other processing aids and fibrous reinforcing agents;
(ii) homogeneously admixing (a), (b) and (c) at a temperature that is above the melting processing temperature of the thermoplastic polymer and the softening temperature of the thermoplastic elastomer or thermoplastic rubber, said temperature being below the decomposition temperature of each of (a), (b) and (c), and
(iii) passing the composition so obtained from said apparatus.

In addition, an aspect of the present invention provides a process for the manufacture of carbide lime in a form suitable for use as a filler in thermoplastic materials, said carbide lime being in the form of a sludge or slurry of solid waste-product from the manufacture of acetylene, such process comprising, in sequence:
(i) screening carbide lime;
(ii) drying the carbide lime to a moisture content of less than 0.6% by weight and maintaining the calcium carbonate content below 25% by weight;
(iii) grinding the dried powder so obtained to a maximum mean particle size of 30 microns; and
(iv) air classifying the dry, ground carbide lime powder, to separate a fraction of lower specific gravity and having a mean particle size of 2–10 microns, with maximum particle size of 40 microns, from coarser and/or denser material.

Additional aspects of the compositions of the invention have 5–60 parts by weight of powdered dried carbide lime having a calcium hydroxide content of 70–85% by weight and a calcium carbonate content of 5–25% by weight, the calcium carbonate being substantially in the form of surface carbonation on the calcium hydroxide.

Further aspects of the present invention provide a composition comprising:
(a) 5–60 parts by weight of a filler having a calcium hydroxide content of 70–85% by weight and a calcium carbonate content of 5–25% by weight, the calcium carbonate being substantially in the form of surface carbonation on the calcium hydroxide;
(b) 20–95 parts by weight of at least one thermoplastic material selected from the group consisting of thermoplastic polymer, thermoplastic elastomer and thermoplastic rubber; and
(c) 0–60 parts by weight of at least one additive selected from lubricants; stabilisers; antioxidants; plasticisers; pigments and dyes; anti-blocking, anti-static, blowing and release agents; flame-retardants; impact modifiers; coupling and wetting agents; other processing aids and fibrous reinforcing agents.

Aspects of the present invention provide a process for the preparation and manufacture of carbide lime into a form suitable for use as a filler in thermoplastic compositions, starting from the sludge or slurry solid waste-product produced as the by-product from the manufacture of acetylene using the reaction of calcium carbide with water. Such carbide lime sludge or slurry may have a wide range of moisture content e.g. from 8% to 65%, depending on the type of process i.e. "wet" or "dry". As noted above, the slurry directly from the process settling or decant tanks of a wet process, usually in the form of a thixotropic pumpable slurry, typically has 55 to 65% by weight moisture. From storage ponds or lagoons where gravity dewatering and evaporation reduces the moisture content, the moisture content is typically 35 to 55% by weight. The moisture content of the slurry from the process decant tanks may be reduced by conventional vacuum filtration to 10 to 30%, or more slowly, by gravity dewatering in tanks or ponds to 30 to 55% by weight. Carbide lime from a dry process has a lower moisture content e.g. 8–10%.

The particle size of the carbide lime, as obtained from a wet or dry process, is generally in the range of 0.5 to 100 microns. However, due to the caking characteristics of the principal component, calcium hydroxide, in air, agglomerates of primary particles and clumps of agglomerates can form, with lumps of material up to several meters in size. These need to be mechanically broken into smaller pieces, by conventional means, and passed through a grid, typically having square openings about 2.5 to 10 cms per side, or a conventional screen, such that the maximum size of the pieces is smaller than any critical dimensions of any subsequent apparatus to avoid blocking of the flow. Filler cake from dewatered decant tank slurry may be fed directly to the process.

From either of these sources, the following steps may be performed, in sequence:

i) preliminary indirect heating and drying of the material to a moisture content of 5 to 20%, preferably 5 to 15%, in an apparatus with minimal contact with air, to reduce the rate of surface carbonation, and with simultaneous mechanical agitation to reduce the particle size of agglomerates and prevent caking;

ii) course sieving of the partially-dried carbide lime with coarse material returned to the first-stage drying and the finer material conveyed to an apparatus for further drying;

iii) secondary drying of the material to less than 0.6% moisture, preferably less than 0.25% moisture, in a conventional direct or, preferably, indirect dryer or by microwave drying at high temperature and with short residence time to minimize surface carbonation, such that total calcium carbonate content is kept below 25% by weight, preferably below 20% and even more preferably below 15%;

iv) size reduction e.g. by grinding, pulverising, milling or crushing of the dried powder to a maximum mean particle size of 30 micron, preferably 15 microns and even more preferably 5 to 10 microns, with the maximum individual particle size of 100 microns, preferably 50 microns in a continuous, non-batch conventional pulveriser. The pulveriser is preferably of the impact or air-jet mill type, where there is particle-to-particle impact;

v) air classification of the dry, ground carbide lime powder to separate and purify the finer sized and lower specific gravity particles. The product preferably has a mean particle size of 2–10 microns, with maximum particle size of 40 microns, preferably 20 microns. Coarser material and higher specific gravity impurities such as calcium carbonate and silicates which form the classifier tailings, may be discarded, used in mortar mixes or recycled and mixed with wet feedstock to the first stage dryer. The fines product from the classifier may be separated from its airstream by conventional cyclone and/or dust collection equipment and stored or bagged under sealed, dry conditions.

Use of the feedstock from the "dry" process may obviate the need for step (i) since its moisture is typically below 10% and it has low surface carbonation if freshly produced.

Preferentially, the preliminary drying of stage (i) may also incorporate windrowing to reduce high ex-pond moisture. Alternatively or additionally, such drying may also involve mixing of the wet feedstock with dried carbide lime recycled as part of the output from any of the stages, (iii) after secondary drying, (iv) after grinding and/or (v) after classifying, preferentially using the coarse "tailings" from the latter.

Optionally, the airstream from the secondary dryer and the fines cyclone separator may be further filtered e.g. by the bag filters and/or electrostatic precipitators to prevent or reduce solid emissions to the environment. The fines that are collected may also be recycled by continuously mixing with the wet feedstock entering the first-stage dryer, to reduce feed moisture. Suitable continuous mixers include trough mixers/dryers, ribbon mixers and pug mills.

In an embodiment of the invention, the apparatus is constructed primarily of stainless steel to prevent both iron pick-up in the filler, which may discolor certain resins, and to prevent corrosion of the equipment due to the corrosive pH nature of the carbide lime when moist.

It should be understood that one of the primary benefits of carbide lime as a filler derives from its lower specific gravity compared to conventional fillers such as calcium carbonate (SG 2.7) or talc (SG 2.8), enabling advantages of lower filler usage by weight, for the same filler volume, and lighter-weight finished compositions and shaped articles. The carbide lime specific gravity may be in the range 2.29 to 2.32 gm/ml, which represents a 14 to 18% lower filler density. As surface carbonation of the calcium hydroxide in the carbide lime increases, its specific gravity increases and the weight benefit is reduced.

Furthermore, the greater the extent of surface carbonation, the lower is he available particle surface area containing resin-accessible hydroxyl groups, which are more hydrophilic and reportedly provide better bonding strengths between resin-filler interfaces than carbonate or silicate groups. Conversely, a benefit of surface carbonated carbide lime is that the inert and pH-neutral calcium carbonate thin outer coating, chemically bonded to the calcium hydroxide of the carbide lime interior, may provide a protective layer, preventing polymer degradation caused by contact with the high pH calcium hydroxide, in the presence of trace amounts of surface moisture, in resins which are sensitive to high pH environments For these reasons, it is therefore important to minimize the extent of carbonation during processing, and also, desirably, in the original slurry feedstock. It is preferable to use freshly prepared carbide lime slurry either from the decant tanks of the "wet" process, or taken directly from the "dry" process, where the initial calcium carbonate content is commonly less than 5% by weight, and typically 1 to 3%. Conversely, if carbide lime slurry has been stored outdoors in exposed storage ponds for lengthy periods, the initial calcium carbonate content may be as high as 15%, and it is more difficult to keep the final carbonation level below 15–20% in the final processed product.

It has been found that the extent of carbonation of the hydroxide in carbide lime in a drying process is a complex matter dependent on a number on inter-related variables including material temperature and moisture content, air temperature and relative humidity, particle-size and surface area of the filler, exposure time and the extent of initial feedstock surface carbonation. In the case of direct dryers, the air velocity and the carbon dioxide content of the dryer inlet air are factors, which varies with fuel and combustion. The carbonation also interacts with the ability to dry the product, since extra moisture is chemically generated in the carbonation reaction in the stochiometric proportion 18:44 of the carbon dioxide reactively absorbed.

It was also found that the propensity of the carbide lime to cake, or agglomerate, increased at moisture contents greater than about 15–20%, such that most feedstocks having moistures greater than this could not be introduced into conventional dryers, since the material caked and plugged the dryer or related conveying and feed metering systems. Furthermore, the longer residence time required for drying these higher moisture feedstocks in air, caused excessive carbonation. However, it was found that this caking and blocking did not occur if the feed to the dryer could be controlled below 15 to 20% moisture, and further that the carbonation created in the dryer could be controlled below 15 to 20% in direct dryers having co-current air. Less carbonation would be expected in counter-current indirect rotary dryers, with less airflow, and even less with microwave or flash dryers. It has been found that flash dryers, operated at high air temperatures and with high air velocities can advantageously be employed, wherein the short resident time can keep added carbonation below 5% and with de-agglomeration of larger particle sizes caused by particle-to-particle impact in the high velocity airstream.

Aspects of this invention therefore include a two-stage drying procedure for the carbide lime, where feedstock moisture exceeds the 20% caking moisture, as is common, or where initial carbonation levels are high. Preliminary, or first stage drying, is required to reduce the moisture content below about 20% while minimizing the extent of carbonation. This requires minimal contact with air, with concurrent mechanical agitation to prevent and break down agglomerates from caking. It has been found that the most suitable apparatus is a screw-conveyor, or "trough", dryer with exterior jacket heated by fluid or steam, preferably with multiple screws, or paddle mechanisms, for agitating and conveying the material through the dryer. Jacketed ribbon blenders and pug mills are also suitable. The use of hollow screws or paddles to improve heat transfer coefficients in particularly preferred. In these types of apparatus, which preferably have a cover, the moisture is effectively steamed off as the material is turned over, with minimal surface area exposed to air.

While such apparatus may optionally be operated under vacuum, or under a blanket of inert gas, the simplest and most economic operation is with a low capacity fan drawing minimal airflow countercurrently through the chamber and using the high water vapour content of this air as a blanket to slow the rate of carbonation. To maximize heating and drying efficiencies, the eating fluid temperatures should be 150 to 350° C., preferably 250 to 350° C. and operated countercurrent to material flow direction. The material temperature should be maintained between 100 to 150° C. to slow the rate of carbonation. Increasing the rotation speed of the screws or paddles improves the heat transfer coefficient and increases the breakdown of agglomerated caked lumps of material, but also increases throughput rate, thereby reducing residence drying time. Consequently it may be necessary, or more efficient, to operate several such dryers in series.

Such apparatus may advantageously incorporate admixing of any dry material recycled as superfines from dust collection equipment and/or as tailings from the air classifier. Such admixing with dry recycle streams reduces feed moisture, and heating may not be required. As well as improving overall heat and mass efficiency, it can act as a means of controlling variable pond-feed moisture.

Further aspects of the invention provide a composition of thermoplastic polymer and carbide lime, especially in which the composition contains 5–60% by weight of carbide lime. In embodiments, the composition comprises 5–60 parts by weight of carbide lime, 20–95 parts by weight of thermoplastic polymer and 0–60 parts by weight of at least one additive selected from lubricants, stabilizers, antioxidants, plasticisers; pigments and dyes; anti-blocking, anti-static, blowing and release agents; flame-retardants; impact modifiers; coupling and wetting agents; processing aids and fibrous reinforcing agents. Uses of carbide lime include use as a filler in thermoplastic polymer compositions.

Other aspects of the invention are directed to a composition comprising 5–60 parts by weight of powdered carbide lime, 20–95 parts by weight of at least one thermoplastic material selected from the group consisting of thermoplastic polymer, thermoplastic elastomer and thermoplastic rubber; and 0–60 parts by weight of at least one additive selected from lubricants; stabilisers; antioxidants; plasticisers; pigments and dyes; anti-blocking, anti-static, blowing and release agents; flame-retardants; impact modifiers; coupling and wetting agents; other processing aids and fibrous reinforcing agents. The carbide lime may interact with the thermoplastic material e.g. the thermoplastic material may be a modified thermoplastic material, but in preferred embodiments the carbide lime is inert with respect to the thermoplastic material.

In embodiments, the thermoplastic material is selected from at least one of polyolefins, polyvinyl chloride; polyvinylidene chloride; copolymers of vinyl chloride or vinylidene chloride with vinyl esters; chlorinated polyvinyl chloride; polyamides; polyacetals; polycarbonates; polyacrylates; thermoplastic polyesters, polystyrene, polybutadiene; polybutylene; copolymers of butylene or butadiene with acrylonitrile; polyester and polyether urethanes, polyetherester elastomers, ethylene/propylene elastomers, and ethylene/propylene/diene elastomers. It is preferred that the carbide lime has a mean particle size of less than 10 microns.

Examples of thermoplastic materials also include a copolymer of ethylene and an ester selected from vinyl acetate and ethyl acrylate, propylene-ethylene and ethylene-butene copolymers, polyethylene terephthalate, polybutylene terephthalate and mixtures thereof, polyolefin elastomer of octene, impact polystyrene, a homopolymer of ethylene or propylene, a copolymer of ethylene or propylene with another alpha-olefin, olefin co-polymer, thermoplastic polyester, a polyolefin elastomer, styrene/butadiene rubber, chlorinated polyethylene or polypropylene oxide.

While the compositions described herein may be fed directly to subsequent thermoforming or melt processing apparatus, they are usually formed into comminuted shapes, e.g. pellets, or into slabs, which are more convenient suitable for storage, transport and feeding to subsequent forming equipment.

Techniques and apparatus for the admixing, melt processing, extrusion or thermoforming of filled thermoplastics, elastomers and rubbers are known in the art. For admixing and melt processing, suitable equipment will include, for example, high-dispersion internal mixers, twin-screw extruders and the like, especially for thermoplastic polymers. For admixing certain elastomers, two-roll shear mills may be preferred. Suitable extrusion, thermoforming or other melt fabrication processes may include injection or blow molding, profile or film extrusion, vacuum and compression molding, casting and calendering and rotational molding. Articles made from compositions of the invention using extrusion, injection molding and calendering may find use in, for instance, rigid duct and drainage piping, building panels such as siding, flexible vinyl flooring, garden/patio furniture, rigid packaging and transportation products.

The present invention relates to the processing and preparation of carbide lime to a form suitable for its use as an economic filler in resin and polymer compounds, and its use therein. Resin, polymer and elastomeric compounds, particularly thermoplastics, and especially polyolefins and polyvinyl chloride, are used in a wide variety of end uses in the form of film, sheet fibers, molded, extruded or thermoformed articles, pipes, fittings, profiles etc.

The present invention is illustrated by the following examples.

EXAMPLE 1

A carbide lime sludge from a "wet-process" storage pond, with 35% moisture content, and having an initial composition of 83% calcium hydroxide, 11% calcium carbonate and 6% silica/iron/alumina/carbon and magnesium oxide impurities was fed at 800 lb/hour (364 kg/hr) to a stainless steel jacketed conveyor dryer with two counter-rotating hollow heated screws rotating at 3 rpm. The screws were heated co-currently by a Dowtherm™ heat transfer fluid having an inlet temperature of 150° C. The partially-dried powdery material leaving this first-stage dryer had a moisture content of 14.3% and an outlet temperature of 100° C.

The partially dried material was fed by a belt conveyor into a stainless steel, direct gas-fired rotary dryer, 5 feet (1.5 m) in diameter and 20 feet (6.1 m) long, operating co-currently and rotating at 1.3 rpm. The inlet and outlet air temperature were 260 and 155° C., respectively. The 600 lb/hour (270 kg/hr) dried material output from the dryer was fed to a Prema™ fine impact grinder model M20, operating at 117 meters/sec with an air-flow pressure drop of 6" w.g. The ground material was fed directly to a "Rema AeroSplit"™ Model MAC 0, 3 HP, air classifier operating with a pressure drop of 8" w.g. The moisture content of the classifier output was 0.52%. The particle size distribution, as measured on a MicroTrac™-SRA9200, is shown in Table 1. The coarse material from the classifier, having a mean particle size of 15–20 microns was recycled back in with the wet feed to the first-stage dryer feed hopper.

The calcium carbonate contents of the fine product and of the coarse tailings were 22% and 24%, by weight, respectively. The specific gravity of the fine product was 2.35 gm/cc. The untamped bulk density of the fines product was 22 lb/cu. ft. (370 kg/m$^3$).

TABLE 1

| Run No. | Ratio Product/ Tailings | Mean | 50% < | 10% < | 90% < | Smallest | Largest |
|---|---|---|---|---|---|---|---|
| | | | Grinding | | | | |
| 1 | N/A* | 14.3 | 9.6 | 2.5 | 33.6 | 0.69 | 114 |
| 2 | N/A | 15.6 | 11.2 | 2.7 | 35.4 | 0.69 | 81 |
| 3 | N/A | 12.9 | 8.4 | 2.4 | 27.6 | 0.70 | 114 |
| 3A | N/A | 9.6 | 6.3 | 2.0 | 22.3 | 0.69 | 57 |
| | | Air-Classifying - Fines/Product | | | | | |
| 2 | 65:35 | 7.3 | 5.3 | 1.9 | 14.7 | 0.69 | 40 |
| 3 | 78:22 | 7.5 | 5.6 | 2.0 | 15.3 | 0.69 | 40 |
| 4 | 71:29 | 7.0 | 5.3 | 2.0 | 14.2 | 0.69 | 40 |
| 5 | 52:48 | 6.0 | 4.9 | 1.9 | 11.9 | 0.69 | 29 |
| 6 | 50:50 | 5.8 | 4.9 | 1.9 | 11.0 | 0.69 | 20 |

*N/A not applicable.

EXAMPLE 2

A carbide lime sludge obtained from decant tanks in a "wet process" for manufacture of acetylene, having a feed moisture content of 57.6% and a calcium carbonate content of only 2%, was fed directly to the equipment described in Example 1 but at a reduced throughput. The product material from the rotary dryer, which had a moisture content of 0.42% and a calcium carbonate content of 17%, was ground and classified to produce a mean particle size of 2–3 microns. This example demonstrates the ability of the process to achieve lower carbonation levels in the final material by the use of a lower carbonate content feed material from the decant tanks.

EXAMPLE 3

The same carbide lime sludge feedstock as in Example 1, with 35% moisture, was continuously admixed with an equal weight of dried carbide lime "tailing" obtained from the rejected coarse oversize stream from the "Rema AeroSplit" model MAC 0 air classifier described in Example 1. This mixing was done in the same jacketed conveyor dryer, or trough dryer, described in Example 1, operating at a screw speed of 3 rpm, with the heating only on the jacket shell. A production rate of 600 lbs/hour (272 kg/hr) was obtained from the preliminary drying stage, with the product having a moisture content from 16 to 18.5%.

The partially dried carbide lime was then continuously fed to a 14" (35.5 cm) diameter "ThermoJet" flash-dryer, manufactured by Fluid Energy Aljet, at feedrates (wet basis) of 2300 to 4500 lb/hr (1045–2045 kg/hr). The dryer was heated by 2100 SCFM air at an inlet temperature from 200–255° C., with the material collected in a cyclone hopper and superfines removed in a dust collection system. Output production rates of 1900 to 3500 lb/hr (860–1590 kg/hr) (dry basis) were obtained, with product moisture contents from 0.4% to 0.7%, depending on process variables.

It was found that this type of dryer, operating with high air velocities of 50 to 60 feet per second (15.2–18.3 m/s) in a donut shaped loop also advantageously caused particle to particle impact with consequent deagglomeration of carbide lime particles, and a consequent significant reduction in mean and topsize particle size. The particle size distribution of this dryer feed and output streams, measured by a Coulter unit using isopropyl alcohol as dispersant, are shown below.

The dried product was then size reduced, using a small jet-mill with integrated air classifier and oversize recycle. The jet-mill, manufactured by Fluid Energy Systems, and operated by Ortech International, Mississauga produced outputs of up to 100 lb/hr using 100 psig compressed air. The median and maximum particle size and size distribution fell well within the typical limits of 5–6 micron median size ("D50 value") and 30 micron topsize ("D100 value"), commonly used for mineral fillers used in plastics. The jet-milled product particle size data, tested on a "MicroTrac" analyser, also using isopropanol dispersant, is shown below.

| | Size - microns ($\mu$m) | | |
|---|---|---|---|
| % | Feed to Dryer | Ex Dryer | Ex Jet-mill |
| Median size $\mu$m | 60 $\mu$m | 15 $\mu$m | 5.2 $\mu$m |
| % > #30 mesh (>600 $\mu$m) | 22% | 0.35% | 0 |
| Analysis of <600 $\mu$m material | | | |
| 10%< | 1.7 $\mu$m | 1.9 $\mu$m | 1.2 $\mu$m |
| 25%< | 5.3 $\mu$m | 5.8 $\mu$m | 2.4 $\mu$m |
| 50%< | 15.6 $\mu$m | 14.4 $\mu$m | 5.2 $\mu$m |
| 75%< | — | 20.0 $\mu$m | 9.2 $\mu$m |
| 90%< | 51.9 $\mu$m | 46.7 $\mu$m | 13.1 $\mu$m |
| 100%< | 176 $\mu$m | 134 $\mu$m | 28.1 $\mu$m |

EXAMPLE 4

A number of different filled resin compositions were made from the dried, ground, classified carbide lime powder made from Run #6 in Example 1. The powder had a mean particle size of 5 microns. The compositions were made using the methods described above, and comparable compositions were also made under the same conditions by substituting a conventional, commercial filler, ground calcium carbonate, with the same (5 micron) average particle size. The components were preweighed, admixed and melt processed in a 3-liter capacity Moriyama™ high dispersion mixer, to a temperature of 140° C. for the high density polyethylene compositions and to 200° C. for the PVC compositions, cooled and then ground into flakes for subsequent thermoforming. The compositions used one or more of the following materials;

(a) #25355N high density polyethylene resin (HDPE), having a density of 0.955 gm/cc and a melt index of 25 dg/min obtained from Dow Chemical;

(b) Geon™ 30 suspension homopolymer polyvinyl chloride resin (PVC), having a density of 1.40 gm/cc, a "K" value of 70 and an inherent viscosity of 1.02, obtained from The Geon Company;

(c) Kemamide™ U, a polyolefin lubricant and release agent additive, having a density of 0.96 gm/cc and obtained from Witco Chemical, a division of Humko Chemical; (d) Vicron™ 25–11, a ground, non-coated, calcium carbonate filler having the same (5 micron) average particle size and a similar size distribution as the carbide-lime. This filler had a density of 2.70 gm/cc, and was made by Speciality Minerals Inc of CA, and obtained via Stochem Inc of Brampton, ON.

(e) #404C, an organo-tin stabiliser for PVC, obtained from Reagens (Canada) Ltd;

(f) #AC629-A, an anti-oxidant/lubricant additive for PVC, obtained from Canada Colors & Chemicals Ltd;

(g) Zinc Stearate, a PVC lubricant agent, obtained from Witco Chemical.

Tensile strength and elongation were measured at 23° C. using the procedure of ASTM D-638, while Gardner impact resistance was tested, using 20 specimens, by the procedure of ASTM D5628-95 using the Bruceton Staircase technique. The type IV dumbbells for tensile testing and the circular specimens for Gardner impact tests for the HDPE compositions, both 0.120" (3 mm) thick, were injected molded at 200° C. For the PVC compositions, 6"×6" square plaques, of 0.150" (3.8 mm) thickness were produced by compression molding at 200° C., from which the tensile bars and Gardner specimens were cut.

Further details and results obtained are given in Table 2.

TABLE 2

A) HDPE Compositions

|  | Sample 1 | | Sample 2 | | Sample 3 | |
| --- | --- | --- | --- | --- | --- | --- |
|  | % by wt | % by vol | % by wt | % by vol | % by wt | % by vol |
| HDPE | 59.5 | 80.2 | 62.3 | 80.2 | 59.5 | 78.4 |
| Kemamide U | 0.5 | 0.7 | 0.5 | 0.7 | 0.5 | 0.6 |
| Vicron 25-11 (CaCO$_3$) | 40.0 | 19.1 | — | — | — | — |
| Carbide lime | — | — | 37.2 | 19.1 | 40.0 | 21.0 |
| Max Tensile strength (psi) | 2715 | | 2883 | | 3010 | |
| Elongation at Break (%) | 6.0% | | 6.2% | | 5.4% | |
| Gardner Impact resistance (in-lb) | 13 | | 11 | | n/a | |
| Density, gm/cc | 1.26 | | 1.20 | | 1.23 | |

TABLE 2-continued

B) PVC Compositions

|  | Sample 4 | | Sample 5 | |
| --- | --- | --- | --- | --- |
|  | % by wt | % by vol | % by wt | % by vol |
| PVC homopolymer | 77.8 | 85.1 | 79.8 | 85.1 |
| 404C tin stabiliser | 1.6 | 2.2 | 1.6 | 2.2 |
| AC629-A antioxidant | 0.4 | 0.5 | 0.4 | 0.5 |
| Zinc stearate | 0.8 | 1.2 | 0.8 | 1.2 |
| Vicron 25-11 (CaCO$_3$) | 19.5 | 11.0 | — | — |
| Carbide lime | — | — | 17.4 | 11.0 |
| Yield Tensile strength (psi) | 7610 | | 7432 | |
| Elongation at Yield (%) | 5.0% | | 5.0% | |
| Break Tensile strength (psi) | 5555 | | 6527 | |
| Elongation at Break (%) | 12.9% | | 9.7% | |
| Gardner Impact resistance (in-lb) | 22 | | 18 | |
| Density, gm/cc | 1.5 | | 1.45 | |

In this example:

Samples No. 2, 3 (in HDPE) and 5 (in PVC) illustrate compositions of the invention.

Samples No. 1 (HDPE) and 4 (PVC) are comparative examples illustrating the properties of the the same resin when filled with a Vicron 25-11, a commercial ground calcium carbonate filler of the same particle size and distribution.

Samples No 2 and 5 are filled at the same percentage by volume by as their comparable calcium carbonate-filled samples No. 1 and 4, respectively.

Sample No. 3, in HDPE, is filled at the same percentage by weight as the No I filled with Vicron 25–11, and exhibits a higher tensile strength but slightly lower break elongation due to the consequent higher filler loading by volume.

This example illustrates that compositions of the invention have useful tensile and impact strength properties with values generally equal to those of equivalent compositions filled with the same size calcium carbonate filler. It also illustrates the advantageous lower density (specific gravity) of the compositions of the invention, i.e. lower weight per unit volume of finished product, with equal physical properties (per unit volume), such lower density benefits being greatest, compared to conventional fillers, when the carbide lime is filled to equal volume.

EXAMPLE 5

A number of further compositions of the invention were made, using the carbide lime produced in Run No. 5 of Example I and using the method of the invention, to illustrate the application and physical properties in other common resin and elastomer systems, carbide lime compatability with other common additives such as pigment fillers, silane surface bonding agents, plasticisers and the like, and a wide range of high and low typical filler loadings. As in Example 4, the components were preweighed, admixed and melt processed in a 3-liter capacity Moriyama™ high dispersion mixer, to a temperature of 140° C. for the HDPE compositions, to 150° C. for the polypropylene compositions and 120° C. for the plasticised polyethylene elastomer composition, cooled and then ground into flakes for subsequent thermoforming.

In addition to the material described in Example 4, the compositions used one or more of the following materials:

(h) KY6100, a polypropylene copolymer resin with EPDM, having a density of 0.904 gm/cc and a melt index of 25 dg/min, obtained from Shell Chemical;

(i) Engage™ 8100, a polyethylene elastomer having a density of 0.85 gm/cc obtained from Dow Chemical;

(j) RCL4, a titanium dioxide white pigment, having a density of 4.0 gm/cc and an average particle size of 0.5 microns, obtained from L. V. Lomas & Co;

(k) A-1120, a silane-based filler bonding additives for polyolefins, supplied by OSI Chemicals, manufactured by Union Carbide Chemicals;

(l) Superpflex™, a high-grade precipitated calcium carbonate filler, coated with 0.2% stearic acid for lubrication, and having an average particle size of 0.7 microns, obtained from Stochem Inc, and manufactured by Pfizer;

(m) Calcium stearate, a polyolefin lubricant additive, obtained from Witco;

(n) Sunpar 2150, a high viscosity paraffinic oil suitable as a plasticiser for polyethylene elastomers, having a density of 0.8956 gm/cc and a viscosity of 21.6 cSt at 100° C., obtained from Noco Lubricants Ltd, made by Sunoco Ltd.

Tensile strength and elongation were measured as in Example 4. The type IV dumbbells for tensile strength for the polypropylene compositions, 0.120" (3 mm) thick, were injection molded at 220° C. For the HDPE compositions, as in Example 4. For the plasticised polyethylene elastomer compositions, 6"×6" square plaques, of 0.150" (3.8 mm) thickness were produced by compression molding at 140° C., from which the tensile bar specimens were cut.

Further details and the results obtained are given in Table 3.

TABLE 3

A) HDPE Compositions

|  | Sample 6 | | Sample 7 | |
| --- | --- | --- | --- | --- |
|  | % by wt | % by vol | % by wt | % by vol |
| HDPE | 61.7 | 80.3 | 59.5 | 80.3 |
| Kemamide U | 0.5 | 0.6 | 0.5 | 0.6 |
| Superplfex (CaCO$_3$) | — | — | 40.0 | 19.1 |
| Carbide lime | 35.7 | 18.5 | — | 13 |
| RCL4-TiO$_2$ pigment | 2.1 | 0.6 | — | — |
| Sub-total fillers | 37.8 | 19.1 | 40.0 | 19.1 |
| Max Tensile strength (psi) | 3440 | | 3050 | |
| Elongation at Break (%) | 2.6% | | 10.0% | |
| Density, gm/cc | 1.21 | | 1.26 | |

B) Polypropylene Compositions

|  | Sample 8 | | Sample 9 | |
| --- | --- | --- | --- | --- |
|  | % by wt | % by vol | % by wt | % by vol |
| Polypropylene | 51.0 | 73.0 | 48.5 | 73.0 |
| Calcium stearate | 1.0 | 1.3 | 1.0 | 1.3 |
| Silane bonding agent | 0.5 | 0.5 | 0.5 | 0.5 |
| Superpflex (CaCO$_3$) | — | — | 50.0 | 25.2 |
| Carbide lime | 45.7 | 24.7 | — | — |
| RCL4 - TiO$_2$ pigment | 1.8 | 0.5 | — | — |
| Sub-total fillers | 47.5 | 25.2 | 50.0 | 25.2 |
| Max Tensile strength (psi) | 4010 | | 3750 | |
| Elongation at Break (%) | 1.6% | | 2.2% | |
| Density, gm/cc | 1.25 | | 1.32 | |

C) Polyethylene Elastomer Compositions

|  | Sample 10 | | Sample 11 | |
| --- | --- | --- | --- | --- |
|  | % by wt | % by vol | % by wt | % by vol |
| Engage PE elastomer | 65.0 | 76.5 | 63.3 | 76.5 |
| Kemamide U lubricant | 0.7 | 0.7 | 0.7 | 0.7 |
| Supar 2150 plasticiser oil | 13.3 | 14.1 | 13.0 | 14.1 |
| Superpflex (CaCO$_3$) | — | — | 23.0 | 8.7 |
| Carbide lime | 21.0 | 8.7 | — | — |
| Max Tensile strength (psi) | 410 | | 500 | |
| Elongation at Break (%) | 890% | | 1190% | |
| Density, gm/cc | 0.998 | | 1.03 | |

In this example:

Samples No 6, 8 and 10 illustrate the use of carbide lime filler, having 5 micron mean size, in three different polymer and elastomer compositions, while Samples No 7, 9 and 11 show the comparable tensile properties of equivalent compounds filled with the same loading, by volume, of Superpflex precipitated coated calcium carbonate of 0.7 micron average size.

Samples No 6, 8 and 10 demonstrate the use of carbide lime filler in a wide range of filler concentrations, from 21 to 45% by weight, 8 to 25% by volume.

Samples 6, 8 and 10 illustrates the compatibility of the carbide lime filler with lubricants, release agents, pigments, surface bonding agents and plasticisers, without loss of useful tensile properties.

Samples No 6 and 8 show the ability to pigment carbide lime filled compositions.

Sample No. 10 shows the use of carbide lime filler in an elastomer composition, with plasticising oil, and the use of the compression molding process used in the preparation of tensile test specimens.

Sample No. 6 and 8 illustrate the compositions typical of admixing and processing in high melt index, 20–30 dg/min, resins suitable as injection molded compounds and show the processability of these compositions whose tensile bar/dumbbell test specimens were injection molded under normal processing conditions.

Samples No 6, 8 and 19 show the lower density benefits of the compositions of the invention, being 3 to 5% lighter then equivalent compositions filled with calcium carbonate at the same volume, without loss of tensile properties. Sample 10 shows an application of such lower density, where the carbide lime filled composition has a specific gravity below 1.0 g/cm$^3$, which would float in fresh water, whereas the calcium carbonate-filled equivalent compound, Sample 11, with a density of 1.03 gm/cc would sink.

This example shows that compositions of the invention in polyethylene (high density) and polypropylene have 7 to 12% higher tensile strength compared to equivalent calcium carbonate-filled compositions at the same filler loading by volume. This higher tensile strength remains even when compared to known low resin-matrix bonding resins, such as polypropylene, when surface treated with silane bonding agents (Sample 8 vs Sample 9).

The initial slope of a tensile stress-strain curve and the maximum (yield) tensile strength, and break (yield) elongation data obtained for these samples also indicate the compositions of the invention have greater stiffness than the equivalent Superpflex filled compositions. Thus for HDPE, 3440 psi (987 MPa) at 2.6% strain for carbide lime, compared to equivalent 3050 psi (875 Mpa) at 10% for Superpflex; for PP 4010 psi (1150 MPa) at 1.6% compared to 3750 psi (1076 Mpa) at 2.2%, respectively.

The lower break elongation values of the carbide lime filled compositions, compared with Superpflex calcium carbonate filled equivalents are believed to be due to the much finer particle size of the Superpflex filler, 0.7 micron average, and its stearic acid coating, compared with the uncoated carbide lime at 5 micron average. The prior Example 4 illustrates the physical properties and equal break elongations when the filler is compared to uncoated calcium carbonate on an equal particle size basis.

EXAMPLE 6

A further series of compositions of the invention were made to illustrate the lack of sensitivity of the properties of carbide lime filled compounds to the source and process from which the by-product waste carbide lime is derived and to its carbonation content. Furthermore, such samples, prepared in the manner described above, were admixed and processed in a low melt index linear low-density polyethylene (LLDPE), typical of resin compounds used for extrusion or blown film applications, to show application in such uses and products.

In addition to the materials in Examples 4 and 5, the compositions used one or more of the following materials:

(o) Dowlex™ 530C, a linear low density polyethylene homopolymer, having a density of 0.922 gm/cc and a melt index of 2.0 dg/min, obtained from Dow Chemical.

The compositions were admixed, melt processed and ASTM dumbbell tensile specimen bars were injection molded. Tensile testing was performed as in Examples 4 and 5.

TABLE 4

LLDPE Compositions

|  | Sample 12 | | Sample 13 | | Sample 14 | | Sample 15 | |
| --- | --- | --- | --- | --- | --- | --- | --- | --- |
|  | % by wt | % by vol | % by wt | % by vol | % by wt | % by vol | % by wt | % by vol |
| LLDPE 530 | 69.3 | 85.2 | 69.3 | 85.2 | 69.3 | 85.2 | 69.3 | 86.4 |
| Kemamide U | 0.7 | 0.8 | 0.7 | 0.8 | 0.7 | 0.8 | 0.7 | 0.8 |
| Superpflex (CaCO₃) | — | — | — | — | — | — | 30.0 | 12.8 |
| RCL4-TiO₂ pigment | 1.0 | 0.3 | 1.0 | 0.3 | 1.0 | 0.3 | — | — |
| Sub-total fillers | 30.0 | 14.0 | 30.0 | 14.0 | 30.0 | 14.0 | 30.0 | 12.8 |
| Max Tensile strength (psi) | 2160 | | 2050 | | 2058 | | 2080 | |
| Elongation at Break (%) | 55% | | 100% | | 85% | | 106% | |
| Density, gm/cc | 1.12 | | 1.11 | | 1.11 | | 1.134 | |

In Sample 12, the carbide lime source was from a storage pond of Air Products Co, which when processed in Example 1, Run 5 had a calcium carbonate content of 22% by weight.

In Sample 13, the carbide lime source was from the decant tanks of the "wet" process of Carbide Graphite Group Inc, which when processed by the method of Example 2, had a calcium carbonate content of 17% by weight.

In Sample 14, the carbide lime was obtained from a Carbide Graphide Group Inc storage pond but had been previously chemically dried by mixing with quicklime prior to processing by the method of Example 1. Its initial calcium carbonate content was 8.4% by weight.

In this example:

Samples 12, 13 and 14 illustrate the consistency of tensile properties of the carbide lime filled compositions, irrespective of the source of such material and with wide variation of calcium carbonate content. The somewhat higher break elongation values of Samples 13 and 14, compared to Sample 12 are believed due to smaller average particle size, 2–3 microns vs 5–6 microns.

Sample 15 is a comparative composition, with the same filler loading, by weight, using Superpflex, a 0.7 micron coated calcium carbonate filler.

The compositions of this example show useful tensile properties, comparable to a composition using high grade, fine calcium carbonate, even when loaded at the same percentage by weight. This results in a higher filler loading by volume, which typically would reduce break elongation values. They also exemplify application in a low melt index resin system, 2.0 dg/min, typical of extrusion compounds.

EXAMPLE 7

Compositions of the invention were prepared to evaluate the effect on physical properties of increasing the filler content of the carbide lime and to compare such properties against equivalent talc-filled compounds. In addition, the effect of incorporating coupling agents was evaluated.

The samples were prepared and test specimens made and tested in the manner described in Example 4.

The compositions used dried, ground carbide lime produced in Example 3 with one or more materials selected from:

(p) a high molecular weight high density extrusion grade polyethylene (HMWHDPE), having a density of 0.94 g/cm³ and a melt index of dg/min, from Nova Corp;

(q) a "Luzenac" talc of 4 micron median particle size;

(r) Fusabond™ MB 1100, a coupling agent made of maleic-anhydride-grafted polyethylene, obtained from Du Pont Canada Inc.

The composition and their physical properties are shown in Table 5.

TABLE 5

HMWHDPE Compositions

|  | Sample 16 | | Sample 17 | | Sample 18 | | Sample 19 | |
| --- | --- | --- | --- | --- | --- | --- | --- | --- |
|  | % by wt | % by vol | % by wt | % by vol | % by vol | % by vol | % by wt | % by vol |
| HMWHDPE | 100 | 100 | 96 | 95.70 | 80 | 90.90 | 70 | 85.40 |
| Carbide lime | 0 | 0 | 10 | 4.3 | 20 | 9.10 | 30 | 14.6 |
| Max tensile strength (psi) | 3735 | | 3615 | | 3545 | | 3284 | |
| Yield elongation (%) | 21% | | 20% | | 18% | | 16% | |
| Break elongation (%) | 59% | | 36% | | 33% | | 27% | |
| Density, gm/cc | 0.94 | | 1 | | 1.07 | | 1.15 | |

|  | Sample 18 | | Sample 20 | | Sample 21 | |
| --- | --- | --- | --- | --- | --- | --- |
|  | % by wt | % by vol | % by wt | % by vol | % by wt | % by vol |
| HMWHDPE | 80 | 90.90 | 78 | 88.6 | 77 | 90.90 |
| Carbide lime | 20 | 9.10 | 20 | 9.10 | — | — |
| Talc | — | — | — | — | 23 | 9.10 |
| Fusabond MB110D | — | — | 2 | 2.30 | — | — |
| Max tensile strength (psi) | 3545 | | 3737 | | 4090 | |
| Yield elongation (%) | 18% | | 18% | | 16% | |
| Break elongation (%) | 33% | | 33% | | 33% | |
| Density, gm/cc | 1.07 | | 1.07 | | 1.11 | |

*Max tensile strength equalled yield strength.

In this example, Samples No. 16 to 19 illustrate the effect on the tensile properties of the compositions of increasing the filler content from 0% to 30% by weight (0% to 14.6% by volume). The gradual reduction in tensile properties with increasing filler loading is comparable to effects of addition of other mineral fillers.

Sample No. 20, when compared against Sample No. 18, at the same filler loading, shows the slight improvement in maximum tensile strength from incorporating 2% of a maleic anhydride grafted polyethylene coupling agent. Such improvement restores tensile strength values to those of the unfilled virgin polymer.

Sample No. 18, compares the tensile properties and density of a 20% by weight carbide lime filled composition to those of Sample No. 21, an equivalent composition filled to the same volumetric loading, 9.1%, with a typical commercial filler-grade talc, of comparable 4 micron mean particle size and distribution. Sample No. 18 shows slightly lower maximum tensile strength, but higher yield elongation, compared to talc, and a 4% lower composition density.

Samples No 17 to 20 demonstrate the usefulness of carbide lime as a general purpose filler over a wide range of typical filler loadings.

EXAMPLE 8

A composition was formed from an impact grade of polystyrene, carbide lime and processing additives, in the form of a blend. The blend was extruded as a sheet and then vacuum formed into door panels.

It was found that the sheet and thermoformed articles obtained from the blend processed well and with good physical characteristics of stiffness and surface finish.

What is claimed is:

1. A composition comprising:
   (a) 5–60 parts by weight of a filler of powdered dried carbide lime having a calcium hydroxide content of 70–85% by weight and a calcium carbonate content of 5–25% by weight, the calcium carbonate being in the form of surface carbonation on the calcium hydroxide, said carbide lime a waste by-product from the production of acetylene gas by reaction of calcium carbide with water, said filler of powdered dried carbide lime having a moisture content of less than 0.6% by weight, a mean particle size of 5–1 0 microns and a maximum particle size of 25 microns;
   (b) 20–95 parts by weight of at least one thermoplastic material selected from the group consisting of thermoplastic polymer, thermoplastic elastomer and thermoplastic rubber; and
   (c) 0–60 parts by weight of at least one additive selected from the group consisting essentially of lubricants; stabilizers; antioxidants; plasticisers; pigments and dyes; anti-blocking, anti-static, blowing and release agents; flame-retardants; impact modifiers; coupling and wetting agents; other processing aids and fibrous reinforcing agents.

2. The composition of claim 1 in which the carbide lime is air classified carbide lime.

3. The composition of claim 1 in which the carbide lime has a specific gravity of 2.29–2.69.

4. The composition of claim 1 in which carbide lime is inert with respect to the thermoplastic material.

5. The composition of claim 4 in which the thermoplastic material is a thermoplastic polymer.

6. The composition of claim 4 in which the thermoplastic material is a thermoplastic elastomer.

7. The composition of claim 4 in which the thermoplastic material is a thermoplastic rubber.

8. The composition of claim 1 in which the thermoplastic material is selected from the group consisting essentially of at least one of polyolefins, polyvinyl chloride, polyvinylidene chloride, copolymers of vinyl chloride or vinylidene chloride with vinyl esters, chlorinated polyvinyl chloride, polyamides, polyacetals, polycarbonates, polyacrylatcs, thermoplastic polyesters, polystyrene, polybutadiene, polybutylene, copolymers of butylene or butadiene with acrylonitrile, polyester and polyether urethanes, polyethcrester elastomers, ethylene/propylene elastomers, and ethylene/propylene/diene elastomers.

9. The composition of claim 8 in which the thermoplastic material is a copolymer of ethylene and an ester selected from the group consisting of vinyl acetate and ethyl acrylate.

10. The composition of claim 8 in which the thermoplastic material is selected from the group consisting of propylene-ethylene and ethylene-butene copolymers.

11. The composition of claim 8 in which the thermoplastic material is selected from the group consisting of polyethylene terephthalate, polybutylene terephthalate and mixtures thereof.

12. The composition of claim 8 in which the thermoplastic material is an polyolefin elastomer of octane.

13. The composition of claim 8 in which the thermoplastic material is impact polystyrene.

14. The composition of claim 13 in which the thermoplastic material is a polyolefin elastomer, polyester, polyether urethanes, polyetherester elastomer, polybutadiene, styrene/butadiene rubber, ethylene/propylene copolymer elastomer, ethylene/propylene/diene elastomer, chlorinated polyethylene or polypropylene oxide.

15. The composition of claim 8 in which the thermoplastic material has a melt index in the range 0.5 to 30 dg/min.

16. The composition of claim 8 in which the thermoplastic material is a homopolymer of ethylene or propylene, a copolymer of ethylene or propylene with another alpha-olefin polyvinyl chloride or polystyrene.

17. The composition of claim 8 in which the thermoplastic material is an olefin co-polymer or thermoplastic polyester.

* * * * *